US012612814B2

(12) United States Patent
Jiang et al.

(10) Patent No.: US 12,612,814 B2
(45) Date of Patent: Apr. 28, 2026

(54) BUTTERFLY DOOR HINGE AND VEHICLE HAVING THE SAME

(71) Applicants: ZHEJIANG ZEEKR INTELLIGENT TECHNOLOGY CO., LTD, Ningbo (CN); ZHEJIANG GEELY HOLDING GROUP CO., LTD, Hangzhou (CN)

(72) Inventors: Kun Jiang, Ningbo (CN); Xinhang Cai, Ningbo (CN); Guolin Li, Ningbo (CN); Wenqing Gao, Ningbo (CN); Zhiyong Liu, Ningbo (CN); Kyuho Lee, Ningbo (CN); Yun Xu, Ningbo (CN)

(73) Assignees: ZHEJIANG ZEEKR INTELLIGENT TECHNOLOGY CO., LTD, Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 345 days.

(21) Appl. No.: 18/429,334

(22) Filed: Jan. 31, 2024

(65) Prior Publication Data

US 2024/0167306 A1 May 23, 2024

Related U.S. Application Data

(63) Continuation of application No. PCT/CN2022/109059, filed on Jul. 29, 2022.

(30) Foreign Application Priority Data

Oct. 25, 2021 (CN) ......................... 202111279476.X

(51) Int. Cl.
*E05D 3/12* (2006.01)
*E05D 7/00* (2006.01)

(52) U.S. Cl.
CPC ............... *E05D 3/127* (2013.01); *E05D 7/00* (2013.01)

(58) Field of Classification Search
CPC .................................. E05D 3/127; E05D 7/00
See application file for complete search history.

(56) References Cited

U.S. PATENT DOCUMENTS 7,100,245 B2 * 9/2006 Wohlfarth ................. E05D 3/10 16/367
8,225,460 B2 * 7/2012 Hooton ..................... E05D 3/10 49/260
2019/0301226 A1 10/2019 Kaburaki et al.

FOREIGN PATENT DOCUMENTS

CN 104141435 A 11/2014
CN 111749566 A 10/2020
(Continued)

*Primary Examiner* — Faye M Fleming

(57) ABSTRACT

A butterfly door hinge and a vehicle having the same are provided, which includes a mounting base, a door connecting arm, a hinge connecting arm, and a limiting assembly, wherein the hinge connecting arm has one end hinged with the mounting base, and the other end hinged with the door connecting arm; the limiting assembly includes a planar limiting portion arranged on the mounting base, and a limiting body arranged on the door connecting arm, the limiting body having a spiral-type outer contour. In the disclosure, first the hinge connecting arm is used to constrain the door to swing along a fixed point, and then a posture of the door is constrained through a frictional fit between the limiting body and the planar limiting portion.

12 Claims, 8 Drawing Sheets

(56) References Cited

FOREIGN PATENT DOCUMENTS

| | | | | | |
|---|---|---|---|---|---|
| CN | 112761444 | A | | 5/2021 | |
| CN | 113250561 | A | * | 8/2021 | ......... E05D 11/1014 |
| CN | 114673417 | A | | 6/2022 | |
| DE | 19754417 | C2 | * | 7/2001 | ......... E05D 11/1071 |
| DE | 102025119272 | A1 | * | 9/2025 | ............... E05D 3/10 |
| WO | WO-2004048138 | A2 | * | 6/2004 | ............. E05D 15/52 |
| WO | WO-2025039663 | A1 | * | 2/2025 | ............... E05D 7/00 |

* cited by examiner

BUTTERFLY DOOR HINGE AND VEHICLE HAVING THE SAME

CROSS-REFERENCE TO RELATED APPLICATION

The application is a continuation application of PCT/CN2022/109059 filed on Jul. 29, 2022, which claims priority of the Chinese patent application No. 202111279476.X, filed on Oct. 25, 2021, the entire disclosure of which are incorporated herein by reference in their entireties for all purposes.

FIELD

The disclosure relates to the technical field of vehicle, in particular, to a butterfly door hinge and a vehicle having the same.

BACKGROUND

At present, most car door opening methods use rotating side hung doors. In the current environment where the requirements for personalized and fashionable vehicle door openings are getting higher and higher, the market demands more personalized door opening methods. Therefore, it is necessary to develop personalized and fashionable door opening methods to meet market demand.

The butterfly door not only has a novel and fashionable opening method that can cater to the individual needs of consumers, but also can meet the needs of consumers for the convenience of getting on and off the vehicle with a smaller opening width. It solves the need for convenience for passengers to get on and off when the parking space is narrow.

The opening solution for traditional single-axis butterfly doors requires the lock body and the lock buckle to be arranged tangentially according to the hinge rotation, which cannot meet the needs of upgrading the butterfly door on the basis of sharing the side outer boards. Therefore, it is necessary to design a hinge where the lock body and the lock buckle can share the position with the rotating side hung door, and that allows the door to be opened upward.

There are currently few hinges with similar opening methods on the market, and their structures are complex, resulting in high costs, complex assembly, poor ride comfort, and high failure rates. They do not meet the needs of generalization and mass production.

SUMMARY

In view of the above drawbacks in the prior art, an objective of the disclosure is to provide a butterfly door hinge and a vehicle having the same, so as to solve the problems of complex structure, high cost, complex assembly, poor ride comfort, and high failure rate for the butterfly door hinge.

In order to achieve the above objective and other related objectives, the disclosure provides a butterfly door hinge, which includes a mounting base, a door connecting arm, a hinge connecting arm, and a limiting assembly, wherein

- the hinge connecting arm has one end hinged with the mounting base and the other end hinged with the door connecting arm, an extension line of axes of the two hinged shafts intersecting at an intersection point;
- the limiting assembly includes a planar limiting portion arranged on the mounting base and a limiting body arranged on the door connecting arm, the limiting body abutting against the planar limiting portion, an area where the limiting body abuts against the planar limiting portion is located at least on both sides of the intersection point.

In an embodiment of the disclosure, the area where the limiting body abuts against the planar limiting portion has a spiral-type outer contour, and the intersection point of the axes of the two hinged shafts is located on an axis of the spiral-type outer contour.

In an embodiment of the disclosure, the limiting body includes two collision units respectively located on both sides of the intersection point, the spiral-type outer contour exists at least on the two collision units, and axes of the spiral-type outer contours of the two collision units are collinear.

In an embodiment of the disclosure, the collision unit is relatively rotatably connected with the door connecting arm along the axis of the spiral-type outer contour, and the collision unit is in rolling fit with the planar limiting portion.

In an embodiment of the disclosure, the collision unit is fixedly connected with the door connecting arm, and the collision unit is in sliding fit with the planar limiting portion.

In an embodiment of the disclosure, the mounting base is provided with a boss, and a top surface of the boss forms the planar limiting portion.

In an embodiment of the disclosure, the limiting body further includes a columnar body fixedly connected with the door connecting arm, and the collision unit is arranged on both sides of the columnar body.

In an embodiment of the disclosure, the door connecting arm includes a first connecting arm, a second connecting arm, and a door connecting portion; the first connecting arm and the second connecting arm have one ends fixedly connected with the door connecting portion and the other ends is fixedly connected with the columnar body; the first connecting arm, the second connecting arm, the door connecting portion, and the columnar body together form a hollow portion capable of receiving the hinge connecting arm.

In an embodiment of the disclosure, the door connecting arm is provided with a first hinge support, and one end of the hinge connecting arm is provided with a tubular first hinge portion; a first pin shaft is arranged in the first hinge portion, and the first pin shaft is connected with the first hinge support.

In an embodiment of the disclosure, the first connecting arm is provided with a first hinge support, and one end of the hinge connecting arm is provided with a tubular first hinge portion; a first pin shaft is arranged in the first hinge portion, and the first pin shaft is connected with the first hinge support.

In an embodiment of the disclosure, the mounting base is provided with a second hinge support, and one end of the hinge connecting arm away from the first hinge portion is provided with a tubular second hinge portion; a second pin shaft is arranged in the second hinge portion, and the second pin shaft is connected with the second hinge support.

In order to achieve the above objective and other related objectives, the disclosure further provides a vehicle, which includes:

- a vehicle body;
- a vehicle door; and
- a butterfly door hinge, comprising:
- a mounting base, connected with the vehicle body;
- a door connecting arm, connected with the vehicle door;

a hinge connecting arm, with one end hinged with the mounting base and the other end hinged with the door connecting arm, an extension line of axes of the two hinged shafts intersecting at an intersection point;

a limiting assembly, comprising a planar limiting portion arranged on the mounting base and a limiting body arranged on the door connecting arm; the limiting body has a spiral-type outer contour, and an intersection point of axes of the two hinged shafts is located on an axis of the spiral-type outer contour; the spiral-type outer contour of the limiting body abuts against the planar limiting portion, and an area where the limiting body abuts against the planar limiting portion is located at least on both sides of the intersection point.

In summary, in the disclosure, first the hinge connecting arm is used to constrain the vehicle door to swing along a fixed point, and then a posture of the vehicle door is constrained through a frictional fit between the limiting body and the planar limiting portion, so that the vehicle door can maintain a specific posture and open sideways during an upward opening process for further enabling a vehicle with the butterfly doors to share a locking system with an ordinary vehicle with side-hinged doors, which reduces the manufacture cost; in addition, compared with the butterfly door hinge and the scissor door hinge in the prior art, the disclosure has a simpler structure, fewer moving pairs, reduces failure rates, and improves the smoothness of the opening and closing process of the vehicle.

In the disclosure, there is no substantial connection relationship between the planar limiting portion and the limiting body. There is only a conflicting fit between the above two, which simplifies the hinge structure to the greatest extent and reduces the difficulty of assembly.

In the disclosure, a rolling fit is formed between the collision unit and the planar limiting portion, which may further reduce frictional resistance, reduce wear of the limiting body, and increase the service life of the hinge.

In the disclosure, the planar limiting portion is arranged on the boss, and the thickness of the boss is significantly greater than the thickness of the mounting base itself, which may provide reliable support for the limiting body.

In the disclosure, the door connecting arm adopts a hollow structure design, which may make the hinge structure more compact, reduce the lateral thickness of the hinge, and free up design space for other structures of the vehicle body while ensuring that the overall structural strength of the hinge meets the design requirements.

BRIEF DESCRIPTION OF THE DRAWINGS

In order to more clearly describe the technical solutions in the embodiments of the present disclosure or in the prior art, the drawings to be used in the description of the embodiments or the prior art will be briefly introduced hereafter. It would be obvious that the drawings described below are only some embodiments of the present disclosure, and a person skilled in the art could obtain other drawings according to these accompanying drawings without involving an inventive effort.

Figure 1:
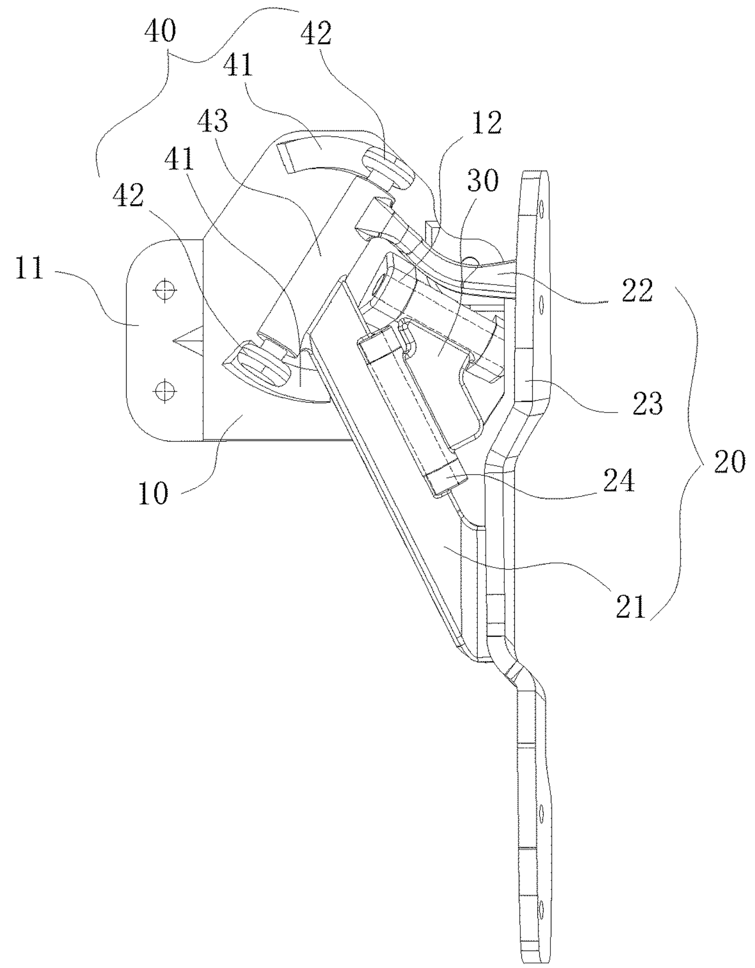
FIG. 1 is a frontal view of a closing status of a butterfly door hinge according to an embodiment of the disclosure.
Figure 2:
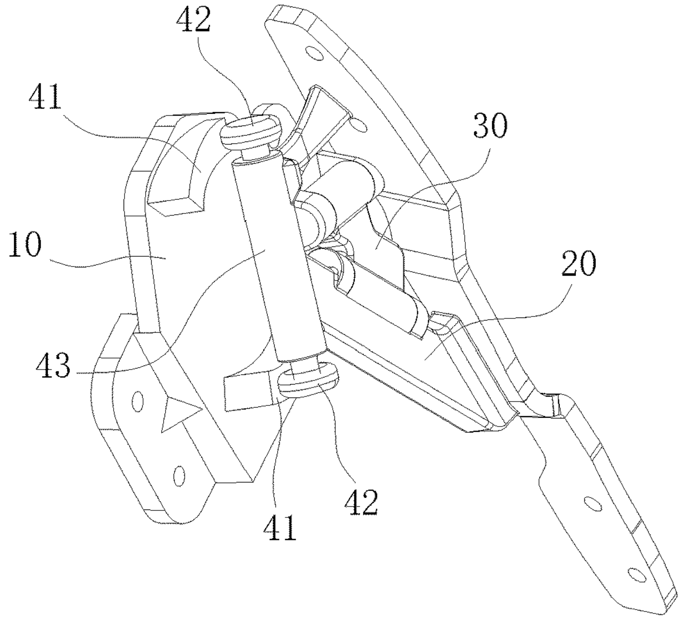
FIG. 2 is a three-dimensional view of the closing status of the butterfly door hinge according to an embodiment of the disclosure.
Figure 3:
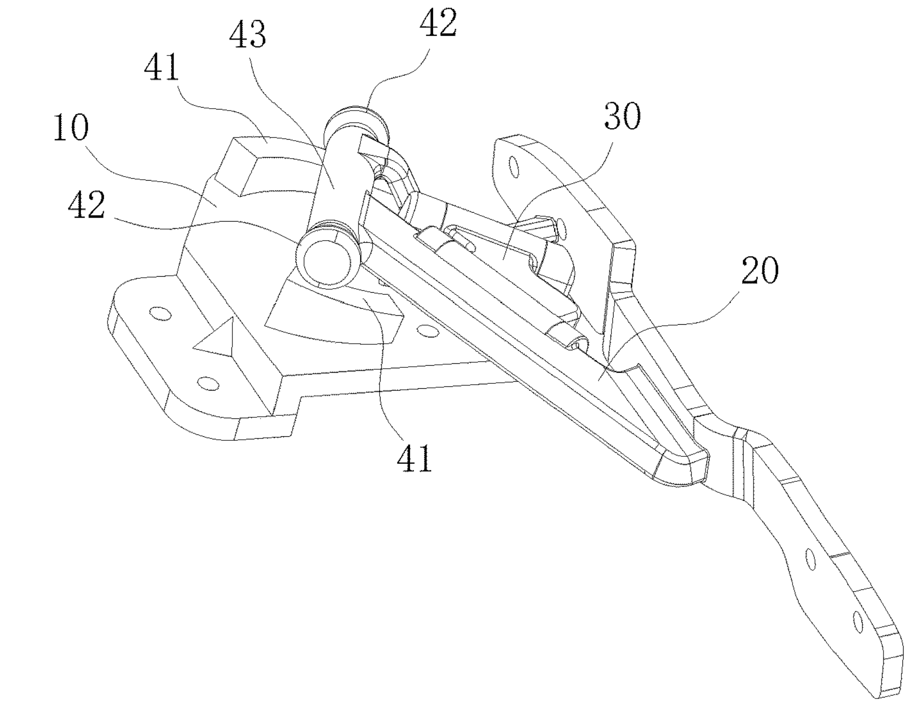
FIG. 3 is a three-dimensional view from another perspective of the closing status of the butterfly door hinge according to an embodiment of the disclosure.
Figure 4:
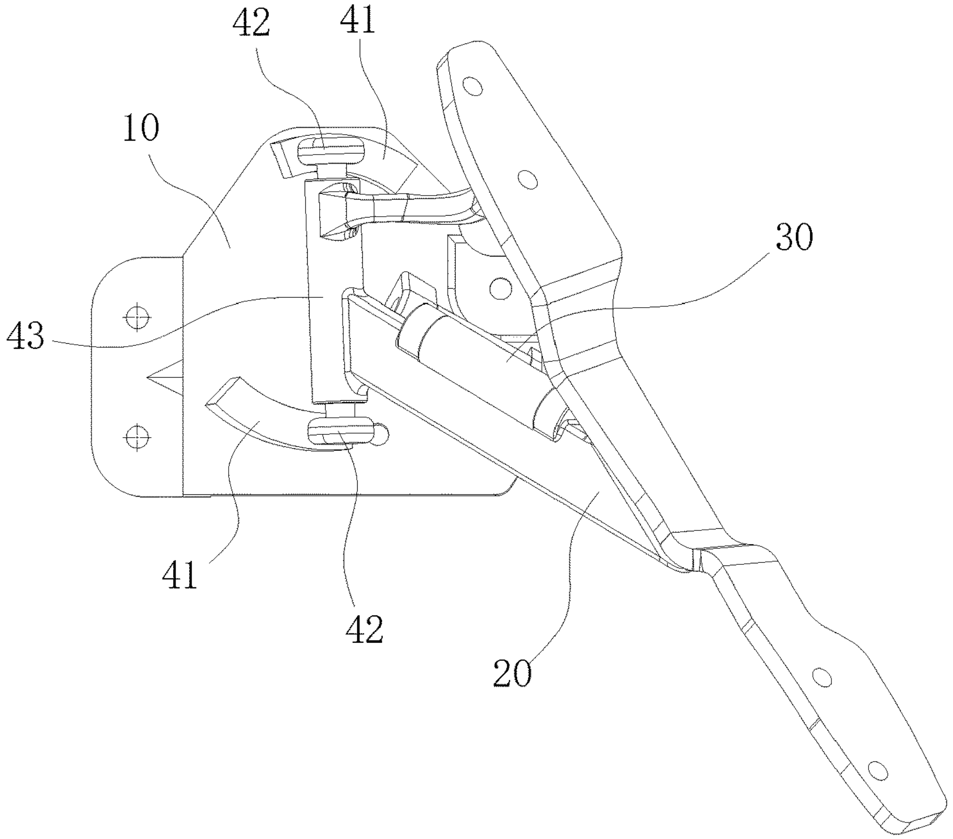
FIG. 4 is a frontal view of an opening status of the butterfly door hinge according to an embodiment of the disclosure.

Descriptions for numerals of members:

1. Vehicle body; 2. Vehicle door; 10. Mounting base; 11. Body connecting portion; 12. Second hinge support; 20. Door connecting arm; 21. First connecting arm; 22. Second connecting arm; 23. Door connecting portion; 24. First hinge support; 30. Hinge connecting arm; 31. First hinge portion; 32. Second hinge portion; 40. Limiting assembly; 41. Planar limiting portion; 42. Collision unit; 43.

Columnar body.

DESCRIPTION OF THE EMBODIMENTS

Through specific examples of the present disclosure below, technicians of the field can easily understand other advantages and efficacies of the present disclosure revealed by the specification. The present disclosure can also be implemented or applied through other different ways, and the details of the specification can also be modified or changed based on different views and applications without deviating from the present disclosure. It should be noted that, in the case of no conflicts, the following embodiments and features in the embodiments can be combined mutually. It should also be understood that the terminology used in the embodiments of the present disclosure is for describing specific embodiments and is not intended to limit the scope of the present disclosure. The experimental methods that do not specify the specific conditions in the following examples are generally based on conventional conditions or according to manufacturer's recommended conditions.

Please refer to FIGS. 1 to 16. It should be noted that the structures, proportions, sizes, etc. shown in the drawings of this specification are only used to coordinate with the content disclosed in the specification for the understanding and reading of those skilled in the art, and are not used to limit the conditions for the implementation of the present disclosure, so they have no technical substantive significance. Any structural modifications, changes in proportions, or adjustments in size should still fall within the scope of the technical content disclosed in the present disclosure without affecting the effectiveness and purpose of the present disclosure. At the same time, terms such as "upper", "lower", "left", "right", "middle" and "one" cited in this specification are only for convenience of description and are not used to limit the scope of the present disclosure. Changes or adjustments in their relative relationships, as long as there is no substantial change in the technical content, shall also be deemed to be within the scope of the present disclosure.

When the embodiments give numerical ranges, it should be understood that, unless otherwise stated in the present disclosure, both endpoints of each numerical range and any value between the two endpoints can be selected. Unless otherwise defined, all technical and scientific terms used in the present disclosure are consistent with those skilled in the art who have knowledge of the prior art and the description of the present disclosure. They can also use methods, equipment, and materials similar to those described in the embodiments of the present disclosure. or any equivalent prior art methods, equipment and materials to implement the present disclosure.

With reference to FIGS. 1 to 4, the disclosure provides a butterfly door hinge, which includes a mounting base 10, a door connecting arm 20, a hinge connecting arm 30, and a limiting assembly 40.

With reference to FIGS. 10 to 13, the mounting base 10 is used to connect a vehicle body 1, specifically, to connect a vehicle frame on a front fender or inside the fender of the vehicle body 1. It can be understood that the mounting base 10 is provided with a body connecting portion 11; in the disclosure the connection between the body connecting portion 11 and the mounting base 10 is not limited to a certain method; for example, the body connecting portion 11 may be fixedly connected with the vehicle body 1 by welding, or the body connecting portion 11 may be connected with the vehicle body 1 by riveting, or the body connecting portion 11 may be connected with the vehicle body 1 by using bolts.

With reference to FIGS. 1 to 4, the hinge connecting arm 30 has one end hinged with the mounting base 10 and the other end hinged with the door connecting arm 20, an extension line of axes of the two hinged shafts intersecting at a point; it can be understood that since the mounting base 10 and the vehicle body 1 are relatively fixed, an intersection point of the above extension line of the two axes must also be fixed relative to the vehicle body 1, the hinge connecting arm 30 may restrict the vehicle door 2 to swing around the intersection point. Based on the above understanding, before the limiting assembly 40 is introduced, the vehicle door 2 may produce the following movements: the vehicle door 2 may swing up and down along a lateral axis, the lateral axis refers to an axis consistent with a width direction of the vehicle, and the consistency does not mean absolute parallelism but means that the lateral axis is generally arranged along the width direction of the vehicle; on the above basis, when the vehicle door 2 swings upward, one end of the hinge connecting arm 30 hinged with the door connecting arm 20 will swing in a direction away from the mounting base 10, and this process will push the door connecting arm 20 away from one side of the vehicle to cause the door connecting arm 20 to swing upward and sideways simultaneously; however, then the door connecting arm 20 also has one more degree of freedom, that is, the door connecting arm 20 may swing freely relative to the hinge connecting arm 30, which may not produce a unique movement trajectory for the vehicle door 2; therefore, the disclosure introduces the limiting assembly 40, and the limiting assembly 40 may constrain the above extra degree of freedom for allowing the vehicle door 2 to have the unique movement trajectory. The specific principle of the limiting assembly 40 will be introduced in detail in subsequent content.

With reference to FIGS. 1 to 6, the limiting assembly 40 includes a planar limiting portion 41 arranged on the mounting base 10 and a limiting body arranged on the door connecting arm 20; the limiting body has a spiral-type outer contour, and an intersection point of axes of the two hinged shafts is located on an axis of the spiral-type outer contour; the spiral-type outer contour of the limiting body abuts against the planar limiting portion 41, and an area where the above two abut against each other being located at least on both sides of the intersection point.

It can be understood that the planar limiting portion 41 in the disclosure does not mean that the limiting portion must be an absolute plane in the geometric sense, but the definition thereof should be understood from a functional perspective; it can be seen from the embodiment of the disclosure that the main function of the planar limiting portion 41 is to limit the limiting body to only move in one plane; and in order to keep the movement of the limiting body smooth, corresponding guide structures with concave and convex tracks may be arranged on the planar limiting portion 41 and the limiting body at the same time, which does not violate the scope of protection claimed by the disclosure.

In the design concept of the disclosure, in order to simplify the structure of the limiting assembly 40 as much as possible, there is no substantial connection relationship between the planar limiting portion 41 and the limiting body, and there is only a conflicting fit between them. Under the above premise, the specific principle of the limiting assembly 40 of the disclosure is: first of all, it has been mentioned above that the position of the intersection point is absolutely fixed relative to the vehicle body 1, and the intersection point is located on the axis of the spiral-type outer contour of the limiting body, so the limiting body may only rotate freely around the intersection point, and then under this premise, the movement of the limiting body may be limited to a specific plane by using the planar limiting portion 41 to abut against both ends of the limiting body.

On the other hand, with reference to FIGS. 1 to 4, since there is relative swing between the door connecting arm 20 and the planar limiting portion 41, and the limiting body is fixedly connected with the door connecting arm 20, the limiting body needs to be able to produce a certain amount of self-rotation; in order to prevent the planar limiting portion 41 from limiting the self-rotation of the limiting body, the disclosure provides a corresponding spiral-type outer contour on the limiting body, and makes the axis of the spiral-type outer contour pass through the intersection point. It can be understood that the rotary outer contour is not limited to a cylindrical shape; for example, the spiral-type outer contour may also be a special-shaped cylinder with a spherical or other special-shaped cross section rotated in a three-dimensional space. In order to ensure that the limiting body may be limited by the planar limiting portion 41 in a specific plane, the areas where the spiral-type outer contour is in contact with the planar limiting portion 41 should be distributed at least on both sides of the intersection point. It can be understood that the above area where the two are in contact may be a whole contact area, or may be two or more independent contact areas, which will be described in detail later by specific embodiments in the disclosure.

With reference to FIGS. 1 to 5, the limiting body includes two collision units 42 located on both sides of the intersection point, the spiral-type outer contour exists at least on the two collision units 42, and axes of the spiral-type outer contours of the two collision units 42 are collinear. It can be understood that in the embodiment, the collision area is divided into two parts, which may reduce the sliding friction in the collision area and further reduce the resistance for the hinge while ensuring the limiting effect.

With reference to FIGS. 1 to 5, in order to better implement the disclosure, the collision unit 42 is relatively rotatably connected with the door connecting arm 20 along the axis of the spiral-type outer contour, and the collision unit 42 is in rolling fit with the planar limiting portion 41. It can be understood that in the embodiment, the collision unit 42 may be, for example, a roller, wherein a rolling fit is formed between the collision unit 42 and the planar limiting portion 41, which may further reduce frictional resistance, reduce wear of the limiting body, and increase the service life of the hinge. In a specific embodiment of the disclosure, the collision unit 42 may be, for example, a metal roller or a roller made of other polymer wear-resistant materials, such as a nylon roller, or a rubber roller.

Figure 14:
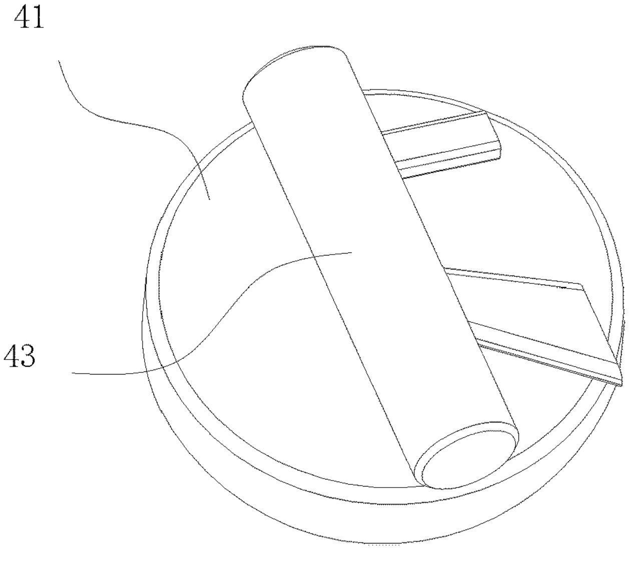
FIG. 14 is a three-dimensional view of a limiting assembly according to an embodiment of the disclosure.
Figure 15:
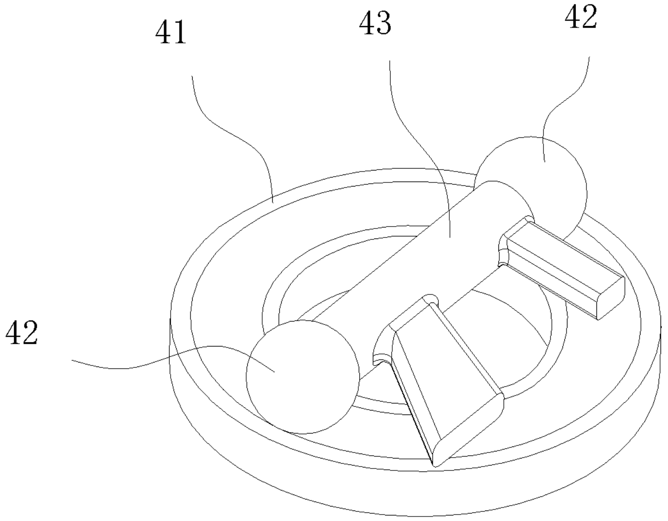
FIG. 15 is a three-dimensional view of the limiting assembly according to another embodiment of the disclosure.
Figure 16:
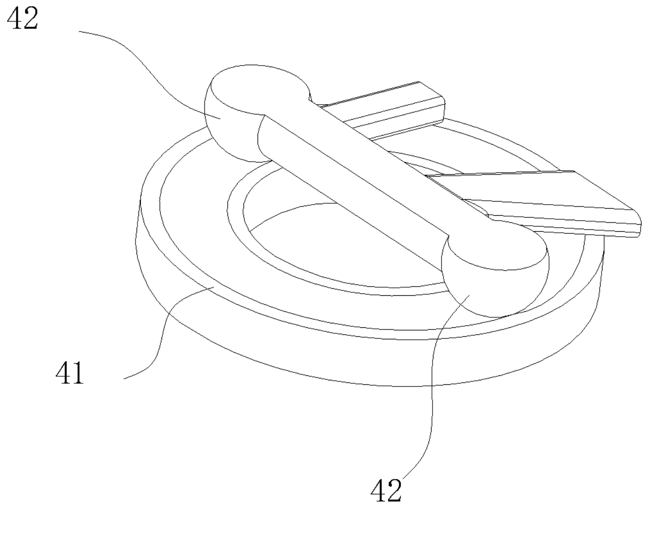
FIG. 16 is a three-dimensional view of the limiting assembly according to a still another embodiment of the disclosure.

With reference to FIGS. 14, 15 and 16, the disclosure further provides various forms of limiting bodies in structure, specifically as follows:

With reference to FIG. 14, the limiting body may be, for example, a cylindrical structure, and an outer circumferential surface of the cylindrical structure integrally forms the collision area; it can be understood that the corresponding planar limiting portion 41 may be, for example, a disk-shaped structure, or of course, may also be an annular mechanism, wherein when the planar limiting portion 41 has an annular structure, both ends of the limiting body need to be placed on the planar limiting portion 41 respectively.

With reference to FIG. 15, the collision unit 42 is a structure with two ball heads, the collision unit 42 is fixedly connected with the door connecting arm 20, and the collision unit 42 is in sliding fit with the planar limiting portion 41. In combination of the drawings, further, the collision unit 42 is fixed at both ends of a columnar body 43. It can be understood that the ball head is in a point-to-point contact with the planar limiting portion 41, which may minimize the frictional resistance between the collision unit 42 and the planar limiting portion 41; it is foreseeable that, in order to improve the smoothness of the opening and closing process of the vehicle door 2, the plane limiting portion 41 may be arranged in an annular groove or an arc groove that matches the movement trajectory of the ball head, for example; however, it should be noted that the arc groove does not restrict the ball head too much, and the ball head essentially has no substantial connection relationship with the planar limiting portion 41, which is consistent with the overall design concept of the disclosure.

With reference to FIG. 15, in the embodiment, it can be understood that on the one hand, the columnar body 43 is to facilitate the fixed connection of the ball head, and on the other hand, the columnar body 43 may keep the two collision units 42 as far away from each other as possible to increase a moment arm between the collision unit 42 and the intersection point; in this way, a load acting between the collision unit 42 and the planar limiting portion 41 may be effectively reduced during the process of opening and closing the vehicle door 2, thereby further reducing the frictional force while improving the smoothness of the hinge.

With reference to FIG. 16, in the embodiment, the spiral-type outer contour is a semi-body structure; it can be understood that during the opening or closing process of the vehicle door 2, the swing formation is limited, so a self-rotation angle corresponding to the limiting portion is also limited; on the above basis, the spiral-type outer contour only needs to ensure that it may closely fit the planar limiting portion 41 within the range of self-rotation angle. Therefore, in the disclosure, the spiral-shape contour does not necessarily refer to a spiral-shape outer contour with a 360° rotation angle, actually, as long as the swing stroke of the vehicle door 2 may be met; for example, the spiral-type contour may be a spiral-type contour of 120°, or may be a spiral-type contour of 180°.

With reference to FIGS. 1 to 4 and FIG. 6, the mounting base 10 is provided with a boss, and a top surface of the boss forms the planar limiting portion 41. It can be understood that the thickness of the boss is significantly greater than the thickness of the mounting base 10 itself, which may provide reliable support for the limiting body; in a specific embodiment, for example, the boss may be integrally formed with the mounting base 10, or the boss may be processed and formed separately, and then the boss may be fixedly connected with the mounting base 10 by means of bolts, riveting or welding. All of the above solutions belong to the scope protected by the disclosure.

With reference to FIGS. 1 to 4, based on the similar understanding, since the opening angle of vehicle door 2 is limited and the limiting body will only swing within a certain range of angle, the boss does not need to be configured as a structure of a full circle or full ring; for example, the boss may be of two arc structures that are symmetrical to each other, which may reduce material consumption and improve economic benefits. Of course, in the actual production process, it is also necessary to combine the molding process and consider the overall manufacturing cost.

Figure 5:
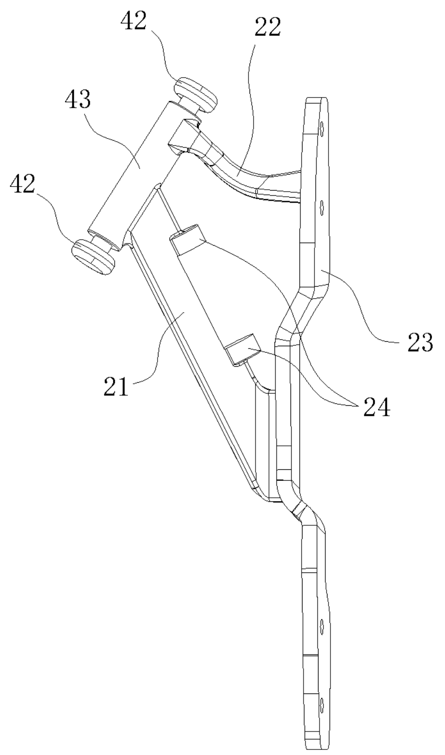
FIG. 5 is a frontal view of a door connecting arm according to an embodiment of the disclosure.
Figure 6:
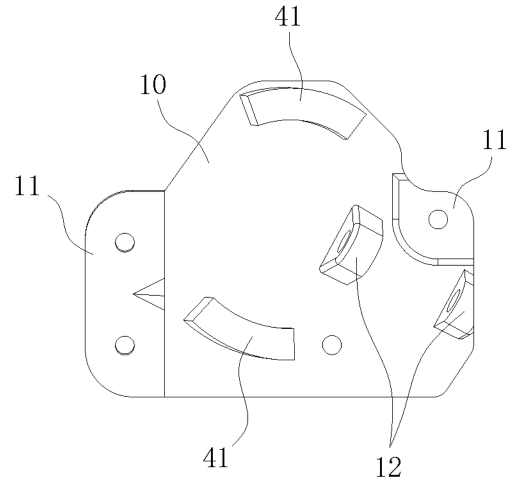
FIG. 6 is a frontal view of a mounting base according to an embodiment of the disclosure.
Figure 7:
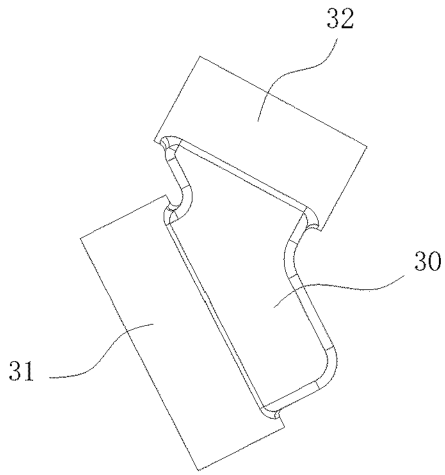
FIG. 7 is a frontal view of a hinge connecting arm according to an embodiment of the disclosure.
Figure 8:
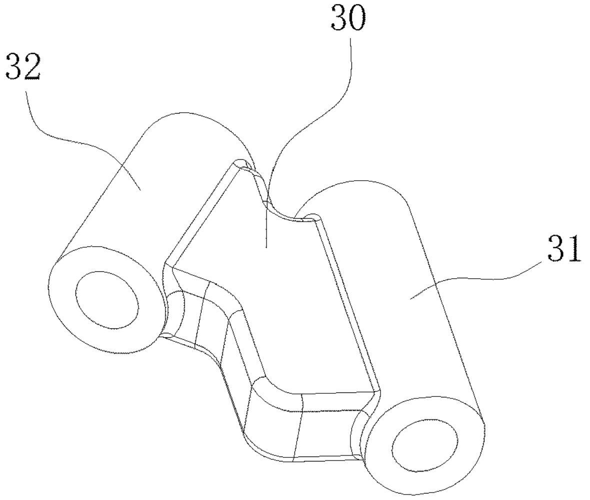
FIG. 8 is a three-dimensional view of the hinge connecting arm according to an embodiment of the disclosure.
Figure 9:
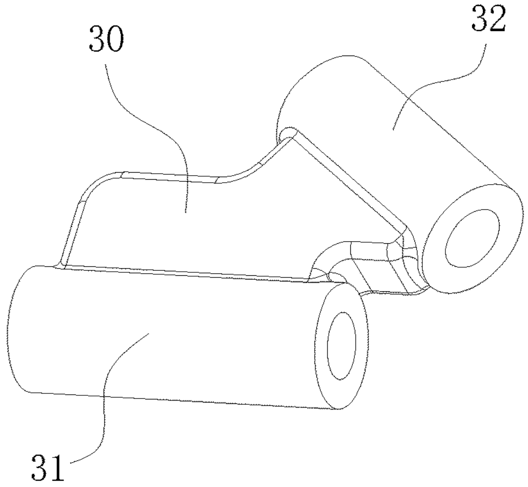
FIG. 9 is a three-dimensional view from another perspective of the hinge connecting arm according to an embodiment of the disclosure.
Figure 10:
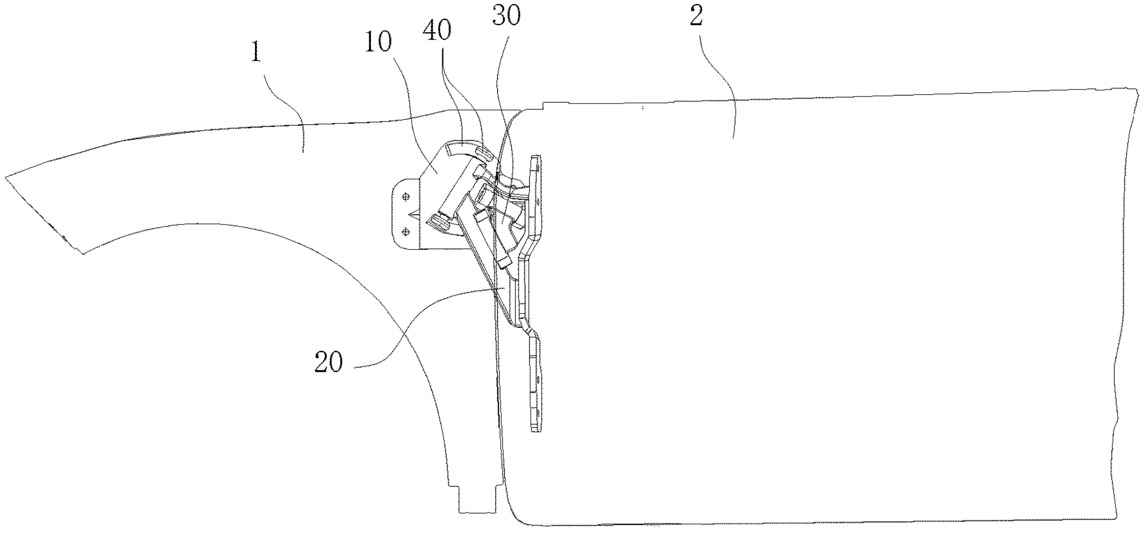
FIG. 10 is a side view of a closing status of a vehicle door leaf according to an embodiment of the disclosure.
Figure 11:
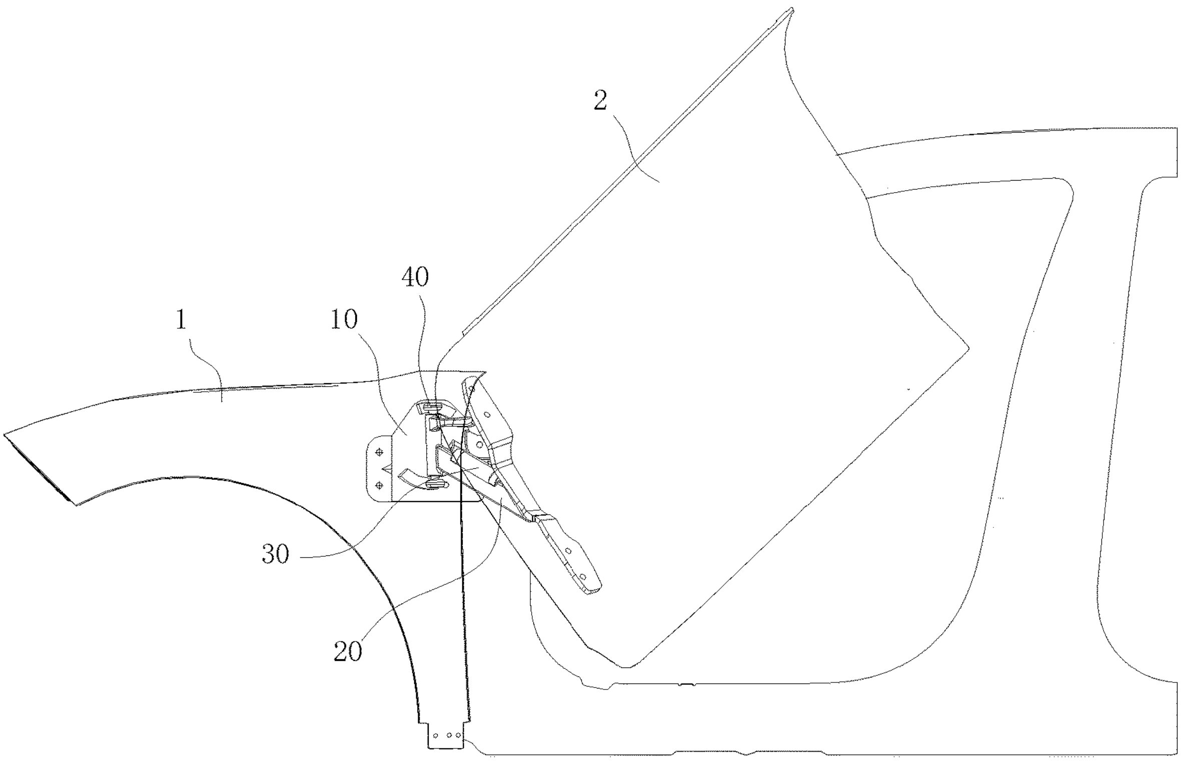
FIG. 11 is a side view of an opening status of the vehicle door leaf according to an embodiment of the disclosure.
Figure 12:
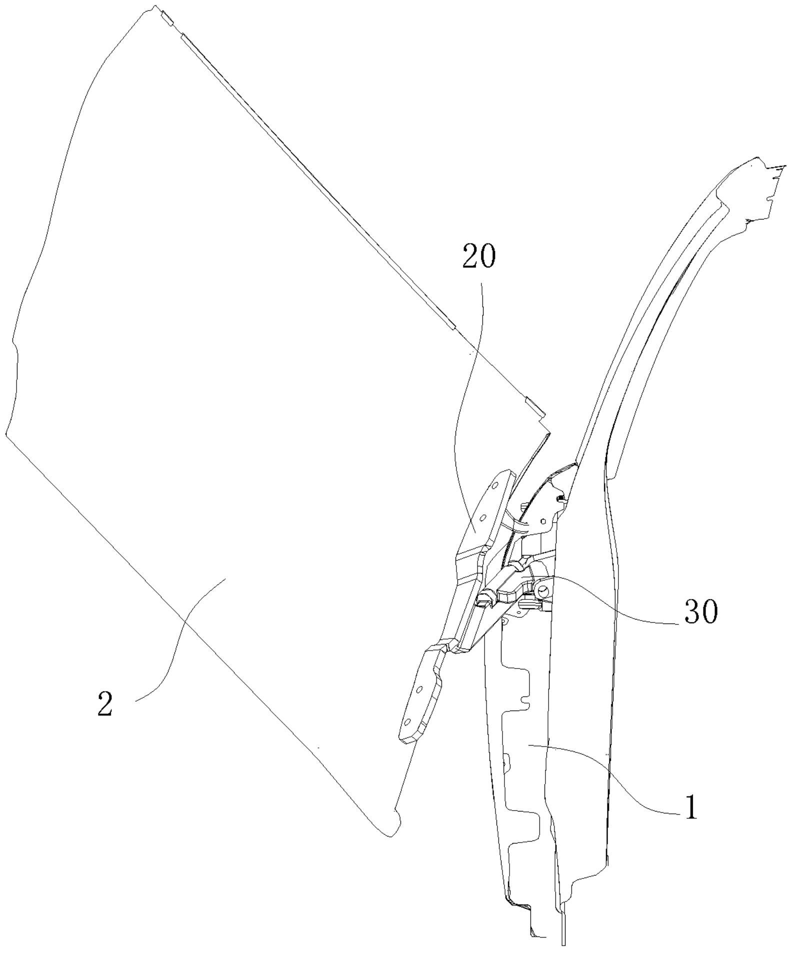
FIG. 12 is a rear view of the opening status of the vehicle door leaf according to an embodiment of the disclosure.
Figure 13:
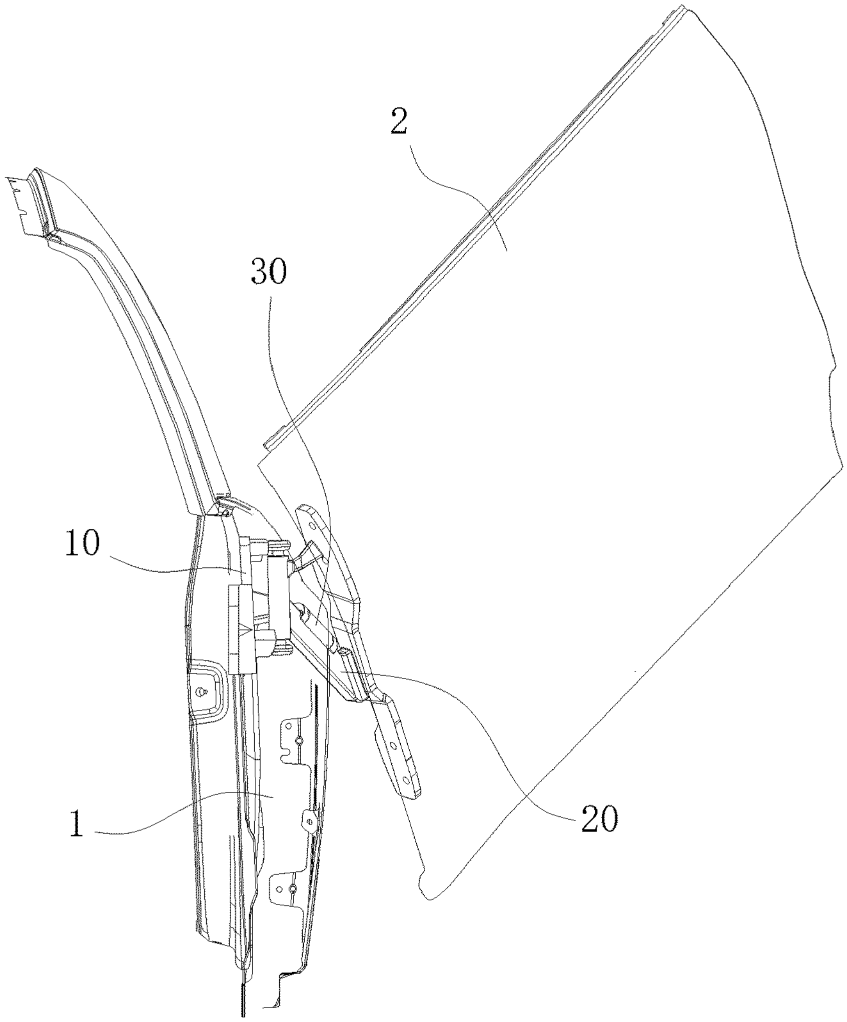
FIG. 13 is a front view of the opening status of the vehicle door leaf according to an embodiment of the disclosure.

With reference to FIG. 5, in the embodiment, the door connecting arm 20 includes a first connecting arm 21, a second connecting arm 22, and a door connecting portion 23; the first connecting arm 21 and the second connecting arm 22 have one ends fixedly connected with the door connecting portion 23 and the other ends is fixedly connected with the columnar body 43; the first connecting arm 21, the second connecting arm 22, the door connecting portion 23, and the columnar body 43 together form a hollow portion capable of receiving the hinge connecting arm 30. It can be understood that with the structure design of the disclosure, on the premise of ensuring that the overall structural strength of the hinge meets the design requirements, the hinge structure may be made more compact, the lateral thickness of the hinge is reduced, and the design space for other structures of the vehicle body 1 is freed up.

With reference to FIG. 5 and FIGS. 7 to 9, the first connecting arm 21 is provided with a first hinge support 24, and one end of the hinge connecting arm 30 is provided with a tubular first hinge portion 31; a first pin shaft is arranged in the first hinge portion 31, and the first pin shaft is connected with the first hinge support 24. It can be understood that for example, the first hinge support 24 may be integrally formed with the first connecting arm 21, or they may be processed and formed separately, and then fixedly connected with the first connecting arm 21 by means of bolts, riveting or welding. It is foreseeable that, for example, the first hinge portion 31 may also be integrally processed and formed with the hinge connecting arm 30, or they may be processed and formed separately, and then fixedly connected with the hinge connecting arm 30. The above specific embodiments are all belong to the scope protected by the disclosure.

With reference to FIGS. 6 to 9, the mounting base 10 is provided with a second hinge support 12, and one end of the hinge connecting arm 30 away from the first hinge portion 31 is provided with a tubular second hinge portion 32; a second pin shaft is arranged in the second hinge portion 32, and the second pin shaft is connected with the second hinge support 12. It can be understood that for example, the second hinge support 12 may be integrally formed with the mounting base 10, or they may be processed and formed separately, and then fixedly connected with the mounting base 10 by means of bolts, riveting or welding. It is foreseeable that, for example, the second hinge portion 32 may be integrally processed and formed with the hinge connecting arm 30, or they may be processed and formed separately, and then fixedly connected with the hinge connecting arm 30. The above specific embodiments are all belong to the scope protected by the disclosure.

With reference to FIGS. 10 to 13, based on the above butterfly door hinge, the embodiment provides a vehicle, which includes a vehicle body 1, a vehicle door 2, and the butterfly door hinge.

With reference to FIGS. 10 to 13, specifically, the butterfly door hinge includes the mounting base 10, the door connecting arm 20, the hinge connecting arm 30, and the limiting assembly 40; the mounting base 10 is connected with the vehicle body 1, specifically, with the vehicle frame on the front fender or inside the fender of the vehicle body 1. It can be understood that the mounting base 10 is provided with a body connecting portion 11; in the disclosure the connection between the body connecting portion 11 and the mounting base 10 is not limited to a certain method; for example, the body connecting portion 11 may be fixedly connected with the vehicle body 1 by welding, or the body connecting portion 11 may be connected with the vehicle body 1 by riveting, or the body connecting portion 11 may be connected with the vehicle body 1 by using bolts.

With reference to FIGS. 10 to 13, the door connecting arm 20 is connected with the vehicle door 2; the hinge connecting arm 30 has one end hinged with the mounting base 10 and the other end hinged with the door connecting arm 20, an extension line of axes of the two hinged shafts intersecting at a point; it can be understood that since the mounting base 10 and the vehicle body 1 are relatively fixed, an intersection point of the two axes must also be fixed relative to the vehicle body 1, the hinge connecting arm 30 may restrict the vehicle door 2 to swing around the intersection point. Based on the above understanding, before the limiting assembly 40 is introduced, the vehicle door 2 may produce the following movements: the vehicle door 2 may swing up and down along a lateral axis, the lateral axis refers to an axis consistent with a width direction of the vehicle, and the consistency does not mean absolute parallelism but means that the lateral axis is generally arranged along the width direction of the vehicle; on the above basis, when the vehicle door 2 swings upward, one end of the hinge connecting arm 30 hinged with the door connecting arm 20 will swing in a direction away from the mounting base 10, and this process will push the door connecting arm 20 away from one side of the vehicle to cause the door connecting arm 20 to swing upward and sideways simultaneously; however, then the door connecting arm 20 also has one more degree of freedom, that is, the door connecting arm 20 may swing freely relative to the hinge connecting arm 30, which may not produce a unique movement trajectory for the vehicle door 2; therefore, the disclosure introduces the limiting assembly 40, and the limiting assembly 40 may constrain the above extra degree of freedom for allowing the vehicle door 2 to have the unique movement trajectory.

With reference to FIGS. 10 to 13, specifically, the limiting assembly 40 includes a planar limiting portion 41 arranged on the mounting base 10 and a limiting body arranged on the door connecting arm 20; the limiting body has a spiral-type outer contour, and an intersection point of axes of the two hinged shafts is located on an axis of the spiral-type outer contour; the spiral-type outer contour of the limiting body abuts against the planar limiting portion 41, and an area where the above two abut against each other being located at least on both sides of the intersection point. It can be understood that the planar limiting portion 41 in the disclosure does not mean that the limiting portion must be an absolute plane in the geometric sense, but the definition thereof should be understood from a functional perspective; it can be seen from the embodiment of the disclosure that the main function of the planar limiting portion 41 is to limit the limiting body to only move in one plane; and in order to keep the movement of the limiting body smooth, corresponding guide structures with concave and convex tracks may be arranged on the planar limiting portion 41 and the limiting body at the same time, which does not violate the scope of protection claimed by the disclosure. In the design concept of the disclosure, in order to simplify the structure of the limiting assembly as much as possible, there is no substantial connection relationship between the planar limiting portion 41 and the limiting body, and there is only a conflicting fit between them. Under the above premise, the specific principle of the limiting assembly 40 of the disclosure is: first of all, it has been mentioned above that the position of the intersection point is absolutely fixed relative to the vehicle body 1, and the intersection point is located on the axis of the spiral-type outer contour of the limiting body, so the limiting body may only rotate freely around the intersection point, and then under this premise, the movement of the limiting body may be limited to a specific plane by using the planar limiting portion 41 to abut against both ends of the limiting body.

In summary, in the disclosure, first the hinge connecting arm 30 is used to constrain the vehicle door 2 to swing along a fixed point, and then a posture of the vehicle door 2 is constrained through a collision fit between the limiting body and the planar limiting portion 41, so that the vehicle door 2 may maintain a specific posture and open sideways during an upward opening process for further enabling a vehicle with the butterfly doors to share a locking system with an ordinary vehicle with side-hinged doors, which reduces the manufacture cost; in addition, compared with the butterfly door hinge and the scissor door hinge in the prior art, the disclosure has a simpler structure, fewer moving pairs, reduces failure rates, and improves the smoothness of the opening and closing process of the vehicle door 2. Therefore, the disclosure effectively overcomes some practical problems in the prior art and has high utilization value and usage significance.

The above embodiments illustrate only the principles and its efficacies of the present disclosure, and are not intended to limit the present disclosure. Modifications and variations can be made to the above-illustrated embodiments without departing from the scope of the present disclosure by anyone familiar with the art. Accordingly, it is intended that the appended claims cover all equivalents of ordinary skill and ordinary skill in the art to which the disclosure pertains without departing from the present disclosure.

What is claimed is:

1. A butterfly door hinge, comprising:

a mounting base;

a door connecting arm;

a hinge connecting arm, of which one end is hinged with the mounting base and the other end is hinged with the door connecting arm, wherein an extension line of axes of two hinged shafts intersecting at an intersection point;

a limiting assembly comprising a planar limiting portion arranged on the mounting base and a limiting body arranged on the door connecting arm, wherein the limiting body abuts against the planar limiting portion, and an area where the limiting body abuts against the planar limiting portion is located at least on both sides of the intersection point.

2. The butterfly door hinge according to claim 1, wherein the area where the limiting body abuts against the planar limiting portion has a spiral-type outer contour, and the intersection point of the axes of the two hinged shafts is located on an axis of the spiral-type outer contour.

3. The butterfly door hinge according to claim 2, wherein the limiting body comprises two collision units respectively located on both sides of the intersection point, the spiral-type outer contour exists at least on the two collision units, and axes of the spiral-type outer contours of the two collision units are collinear.

4. The butterfly door hinge according to claim 3, wherein the collision unit is relatively rotatably connected with the door connecting arm along the axis of the spiral-type outer contour, and the collision unit is in rolling fit with the planar limiting portion.

5. The butterfly door hinge according to claim 3, wherein the collision unit is fixedly connected with the door connecting arm, and the collision unit is in sliding fit with the planar limiting portion.

6. The butterfly door hinge according to claim 1, wherein the mounting base is provided with a boss, and a top surface of the boss forms the planar limiting portion.

7. The butterfly door hinge according to claim 3, wherein the limiting body further comprises a columnar body fixedly connected with the door connecting arm, and the collision units are arranged on both sides of the columnar body.

8. The butterfly door hinge according to claim 7, wherein the door connecting arm comprises a first connecting arm, a second connecting arm, and a door connecting portion; the first connecting arm and the second connecting arm have one ends fixedly connected with the door connecting portion and the other ends fixedly connected with the columnar body; the first connecting arm, the second connecting arm, the door connecting portion, and the columnar body together form a hollow portion capable of receiving the hinge connecting arm.

9. The butterfly door hinge according to claim 1, wherein the door connecting arm is provided with a first hinge support, wherein one end of the hinge connecting arm is provided with a tubular first hinge portion, a first pin shaft is arranged in the first hinge portion, and the first pin shaft is connected with the first hinge support.

10. The butterfly door hinge according to claim 8, wherein the first connecting arm is provided with a first hinge support, wherein one end of the hinge connecting arm is provided with a tubular first hinge portion, a first pin shaft is arranged in the first hinge portion, and the first pin shaft is connected with the first hinge support.

11. The butterfly door hinge according to claim 1, wherein the mounting base is provided with a second hinge support, wherein one end of the hinge connecting arm is provided with a tubular second hinge portion, a second pin shaft is arranged in the second hinge portion, and the second pin shaft is connected with the second hinge support.

12. A vehicle, comprising:

a vehicle body;

a vehicle door; and a butterfly door hinge comprising:

a mounting base connected with the vehicle body;

a door connecting arm connected with the vehicle door;

a hinge connecting arm, of which one end is hinged with the mounting base and the other end is hinged with the door connecting arm, an extension line of axes of the two hinged shafts intersecting at an intersection point;

a limiting assembly comprising a planar limiting portion arranged on the mounting base and a limiting body arranged on the door connecting arm, wherein the limiting body has a spiral-type outer contour, the intersection point of axes of the two hinged shafts is located on an axis of the spiral-type outer contour; the spiral-type outer contour of the limiting body abuts against the planar limiting portion, and an area where the limiting body abuts against the planar limiting portion is located at least on both sides of the intersection point.

* * * * *